United States Patent [19]
Bradley

[11] 3,783,380
[45] Jan. 1, 1974

[54] FREQUENCY SELECTIVE LEVEL METER WITH AN AUTOMATIC DISTORTION ELIMINATOR

[75] Inventor: Donald A. Bradley, Milpitas, Calif.
[73] Assignee: Cushman Electronics, Inc., Sunnyvale, Calif.
[22] Filed: May 8, 1972
[21] Appl. No.: 251,296

[52] U.S. Cl. .............................................. 324/130
[51] Int. Cl. ............................................. G01r 1/02
[58] Field of Search................. 324/128, 130, 126, 324/57 R

[56] References Cited
UNITED STATES PATENTS
3,480,862  11/1969  Bayer ............................ 324/128 X

Primary Examiner—Alfred E. Smith
Attorney—Karl A. Limbach et al.

[57] ABSTRACT

A frequency selective level meter having automatic circuits for first adjusting an input attenuator to bring a signal level applied to a measuring circuit within its measuring range or "window," and subsequently to adjust the input attenuator and a high gain amplifier in the path of the signal by equal amounts in order to reduce distortion generated as a result of non-linearities of components operated on by the signal. Such distortion is detected by switching simultaneously both input and output circuits of non-linear elements between two levels of gain or attenuation while keeping the overall gain of the circuit the same in both levels.

19 Claims, 3 Drawing Figures

FREQUENCY SELECTIVE LEVEL METER WITH AN AUTOMATIC DISTORTION ELIMINATOR

BACKGROUND OF THE INVENTION

This invention relates generally to frequency selective level meters, and more particularly to improved adjustment techniques for frequency selective level meters.

Signal level meters of various types are widely used, a common application being the measuring of signal or noise levels in a communication channel such as are provided by a telephone company. Such meters are often required to measure very low levels, such as −100 dbm or less, as well as being able to satisfactorily measure signals in excess of 0 dbm. Logic circuits of the measuring the display portions of signal level meters require high driving signals within their display range or "window." Therefore, a high gain amplifier is required as part of such a meter in order to bring the level of very low signals up within the range of the measuring and display portion thereof.

Many signal level meters are tunable to measure signals or noise within a limited frequency range to the exclusion of other signals that are present but outside of a selected frequency range. Signals applied to signal level meters often include high level signals of frequencies outside a frequency range of interest. Meter circuits such as frequency translating mixers and amplifiers have limited linear dynamic ranges. Signals outside the frequency range of interest are often modulated among themselves in regions of non-linearity of these circuits to generate signals or noise within the frequency range of interest that undesirably become a part of the measurement. It has been recognized that an input attenuator in advance of the element whose regions of non-linearity cause some problem may be used to attenuate strong signals outside the frequency range of interest to cause them to operate within a linear region of the element. The generation of harmonics within a frequency range of interest is thereby significantly reduced. Amplification is subsequently applied after the non-linear element to compensate for the attenuation. The signal of interest within the frequency range of interest is also reduced by such attenuation and thus the signal-to-noise ratio of the meter circuit is degraded by such an adjustment. However, the reduction of signal-to-noise ratio is generally north the improved operation resulting from a reduced distortion level. If there are no strong signals at adjacent frequencies to the frequency range of interest, the meter is operated at a high signal-to-noise ratio with its input attenuation set at the lowest possible level for the level of the signal being measured.

It is a primary object of the present invention to provide a method and apparatus for determining when such distortion caused by a circuit element having regions of non-linearity results in a significant error in a measurement of the signal of interest.

It is a further object of the present invention to provide an automatic means for adjusting the signal level meter signal-to-noise ratio to reduce the effects of circuit non-linearities on the measurement of a signal of interest.

It is yet another object of the present invention to provide an improved automatic means for initially adjusting input attenuation of a level meter to bring the signal of interest within the range or "window" of the measuring and display circuits.

SUMMARY OF THE INVENTION

These and additional objects are accomplished by the present invention wherein, according to one aspect thereof, the attenuation or gain of both input and output circuits of a circuit element or elements having regions of non-linearity in a signal level meter are simultaneously switched between two levels in a manner that overall gain of the signal level meter remains constant. A mixer of a frequency translator or an amplifier, for instance, may be linear for a certain range of signal levels but may also be non-linear for another range of signal levels. As a specific example for detecting when a signal is being distorted by such non-linearities, input attenuation may be increased by a certain decibel level simultaneously with the increase of amplification after the non-linear element by the same decibel level, whereby overall gain of the circuit is unchanged. If there is a difference in the measured signal level within a frequency range of interest at the output of the amplifier after this attenuation and gain has been switched, this indicates that strong signals outside the frequency range of interest are operating in the non-linear region of the element and generating components within the frequency range of interest. These undesirable components are the "distortion" referred to herein. In response to this signal level difference exceeding a threshold amount, automatic means are provided for simultaneously adjusting an input attenuator and a high gain amplifier after the non-linear element by equal decibel levels brings the level of the signals outside the frequency range of interest to within a more linear region of the element.

This automatic distortion elimination is accomplished in a second phase of adjustment which generally follows in time a different adjustment in a first phase of the total automatic level meter adjustment. The first phase includes the setting of an input attenuator so that the signal reaching the measurement and display circuits is within their range or "window." The second phase automatic adjustment and its resulting reduction of the signal-to-noise ratio is necessary only when strong signals exist at frequencies outside the selected frequency range; otherwise, the signal-to-noise ratio remains at its highest possible value.

Additional objects, advantages and details of the various aspects of the present invention are described in the following description of a preferred embodiment thereof which should be taken in conjunction with the accompanying drawings.

DESCRIPTION OF THE PREFERRED EMBODIMENTS

Figure 1:
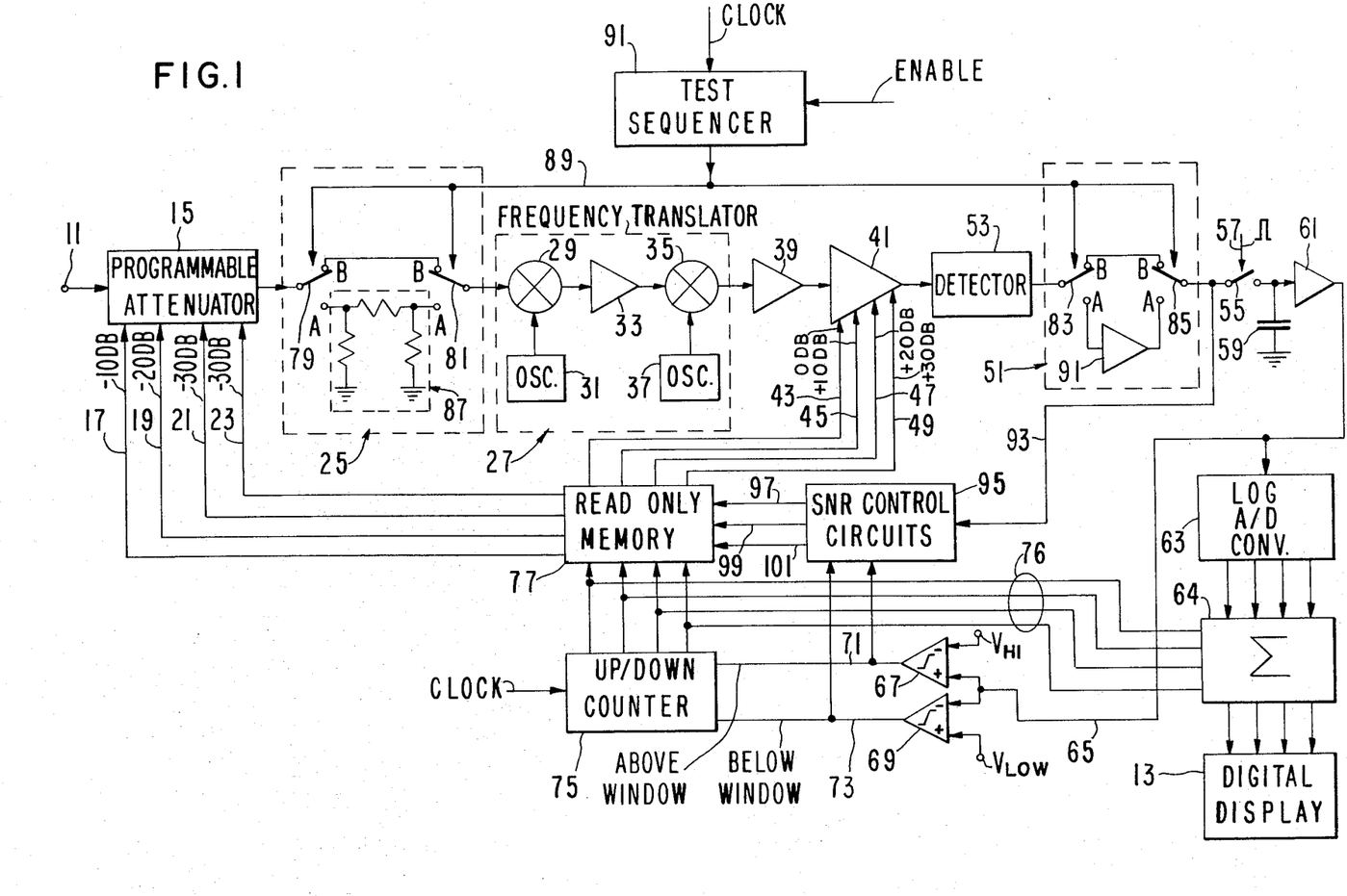
FIG. 1 is a general block diagram of an improved frequency selective level meter which embodies the various aspects of the present invention.

Referring to FIG. 1, a source (such as a telephone circuit) of a signal to be measured is connected with an input 11 of the level meter circuits. A digital display circuit 13 is provided to present a visual display of a particular signal level applied to the input terminal 11. The display circuit 13 has a narrow signal level range or window in the vicinity of 0 dbm, such as a window of 10 db with an upper signal level of 0 dbm. The purpose of the circuits in between the input terminal 11 and the display portion 13 is to select a narrow band signal from a very wide frequency spectrum input to the terminal 11, to amplify or attenuate that signal to fall within the window of the display device 13 and further to adjust attenuation and gain so that the signals are operating in linear regions of the frequency translator and amplifier circuits.

A signal applied to the input terminal 11 is provided to a programmable attenuator 15. The programmable attenuator 15 is adjustable in increments, such as 10 db increments over a range of 0–90 db. Such an attenuator is commercially available and is controlled digitally through control lines 17, 19, 21 and 23. If an attenuation of 50 db is desired, for instance, the proper binary character is applied in the lines 19 and 21 to activate 20 and 30 db pads, respectively, to form a total of 50 db attenuation.

The attenuated signal at the output of the programmable attenuator 15 is subsequently passed through a switchable attenuation circuit 25. The attenuated signal output of the circuit 25 is then applied to a frequency translating circuit 27 which selects from all of the different frequency signals applied to the input terminal 11 that narrow bandwidth of interest and converts that bandwidth to a predetermined intermediate frequency signal for subsequent amplification. The frequency translating circuit 27 shown in FIG. 1 includes a first mixer 29 which receives the output of the circuit 25 and mixes it with a signal developed by a variable frequency local oscillator 31. The output of the mixer 29 is then applied to an intermediate frequency amplifier 33. The amplifier 33 is provided with a bandpass filter for passing the signal of interest and for isolating the mixer 29 from subsequent circuits. The output of the amplifier 33 is applied to a second mixer 35 where it is mixed with a signal from a fixed frequency oscillator 37. A desired signal frequency range within the input spectrum at the terminal 11 is tuned by the frequency translator 27 into a certain frequency bandwidth at the output of the mixer 35.

The output of the mixer 35 is applied to a high gain amplifier 39 which, for the specific example herein, has a gain of 80 db. Because of the frequency translating circuit, the high gain amplifier 39 need respond only over a narrow frequency range. In certain circumstances, a tuned amplifier can be substituted for the frequency translator 27 and the amplifier 39. The output of the high gain amplifier 39 is applied to a programmable amplifier 41 which has four gain levels possible depending upon which of the gain control lines 43, 45, 47 or 49 are programmed. For instance, if the line 47 is programmed, the amplifier 41 will have a 20 db gain. The cascade combination of the amplifier 39 and 41 provide programmable amplification in the range of from 80 db to 110 db.

The output of the programmable amplifier 41 is applied to a detector 53 and thence to a switchable gain circuit 51. The detector 53 converts the alternating current waveform at its input to a direct current signal at its output. The magnitude of the direct current output signal is proportional to the magnitude of the alternating current input signal. The direct current signal at the output of the switchable gain circuit 51 is applied to a semi-conductor switch 55, such as one including a FET device, whose closure is determined by a control signal in the line 57. A capacitor 59 receives the d.c. signal output of the detector 53 when the switch 55 is closed and it stores the d.c. signal after the switch 55 has been opened. A buffer amplifier 61 is provided to isolate the capacitor 59 from the rest of the circuit. The output of the amplifier 61 is a direct current signal that is applied to the measuring and display circuits of the level meter. These circuits include a logarithmic analog-to-digital converter 63 and a digital summation circuit 64. The output of the digital summation circuit 64 is a digital representation of the magnitude of the signal of interest applied to the input terminal 11. The display circuit 13 receives this digital signal and displays it in dbm units.

The signal applied to the measuring and display circuits is also applied by way of a line 65 simultaneously to non-inverting and inverting inputs of comparator amplifiers 67 and 69, respectively. The comparator 67 has a voltage $V_{HI}$ applied to its inverting input for comparison with the signal voltage in the line 65. Similarly, the non-inverting input of the comparator 69 has a voltage $V_{LOW}$ applied to it for comparison with the signal in the line 65. The voltage $V_{HI}$ is set to be equal to the upper limit of the range or window of the measuring and display blocks 63 and 13. Similarly, the voltage $V_{LOW}$ is set at the lower edge of that range. Therefore, an error signal will exist in a line 71 at the output of the comparator amplifier 67 when the signal level in the line 65 is outside the window of the measuring and display circuits. Similarly, when the signal is below the window, an error signal occurs in the line 73 at the output of the comparator amplifier 69.

The two error signals in the lines 71 and 73 are utilized to drive a binary up-down counter 75 whose counter output is connected to a decoding circuit in the form of a read-only memory 77. The state of the counter 75 is a first input to the memory 77 and controls the binary signal in the lines 17, 19, 21 and 23 and thus controls the attenuation setting of the programmable attenuator 15. An overrange error signal in the line 71 causes the counter 75 to increment in a manner that the attenuator 15 adds another 10 db of attenuation. Similarly, if an error signal occurs in the line 73, the counter 75 changes its state in a manner to subtract 10 db of attenuation from the attenuator 15. This proceeds until there is no longer any error signal in either of the lines 71 or 73.

When these error signals do not exist, the signal level applied to the analog-to-digital converter 63 is thus within the window or range of that circuit and the digital display 13. The attenuator 15 has been automatically set by way of a closed loop feedback circuit with error signals to a level that accomplishes this result. The programmable amplifier 41 has been held at 0 db during this adjustment. Switches 79 and 81 of the switchable attenuator 25 and switches 83 and 85 of the siwtchable gain circuit 51 are held in their B position as shown in FIG. 1 and do not affect the circuit in any way. Also, switch 55 is held in its closed position. By this first phase of the circuit's automatic adjustment, the input signal has been brought to within a range of window of the measuring and display circuit blocks 63 and 13. The frequency of the signal to be examined has been selected by manual adjustment of an operator of the frequency of the local oscillator 31.

The state of the counter 75 as appearing at its output lines is applied through lines 76 to the summation circuit 64. The digital display circuit 13 therefore displays a signal level that is the total of the attenuation level of the programmable attenuator 15 and the signal level at the analog-to-digital converter 63.

In the second phase of automatic adjustment of the circuit of FIG. 1, any distortion caused by very strong signals outside the frequency bandwidth of interest is reduced to within tolerable levels by the technique and circuitry to be described with respect initially to FIG. 1. An attenuating pad 87 is a major component of the switchable attenuator 25. This pad may be placed in the signal path between the programmable attenuator 15 and the frequency translator 27 by operation of the switches 79 and 81 which are preferably FET devices. The switches 79 and 81 are switched in response to control signals in a line 89 as developed by a test sequencer circuit 91. The attenuation level of the pad 87 is chosen to be only a small fraction of the window or range of the measuring and displaying circuits 63 and 13. Since this window and the incremental steps in the programmable attenuator 15 are 10 db in a specific example, the pad 87 is conveniently 2 db. This pad is alternately switched into and out of the circuit by controlling the switches 79 and 81. As this is done, all signal levels present at the input 11 to the circuit are moved up and down in magnitude by 2 db relative to the characteristic of the mixer 29. The mixer 29 sees the entire spectrum of signals applied to the input terminal 11. Non-linear operating regions of the mixer 29 cause the primary signal level reading errors when signals outside the frequency range of interest are strong enough to operate in such non-linear regions and generate harmonics within the frequency range of interest. It is a primary goal of the circuit to automatically reduce such harmonics to within tolerable levels so that accurate readings of signals within the frequency range of interest may be made.

In synchronism with the switching of the pad 87 into and out of the signal path, the switchable gain circuit 51 is switching an amplifier 91 into and out of the signal path in response to the same control signal 89. The switches 83 and 85 are preferably FET devices. If the pad 87 is 2 db, the amplifier 89 is given a 2 db gain. The pad 87 is switched into the signal path simultaneously with the amplifier 91 being switched into the signal path. Thus, the simultaneous switching of the switchable attenuator 25 and the switchable gain circuit 51 does not affect the total gain of the circuit but rather one complements the other. Thus, any changes in the signal level at the output of the detector 53 indicates the existence of undesired harmonic generation (distortion) by a non-linear element, primarily the mixer 29. The output of the circuit 51 is monitored to detect such differences by connection through a line 93 to signal-to-noise ratio control circuits 95. When a significant change in the signal level above a threshold amount in the line 93 occurs as the pad 87 and the amplifier 91 are switched into or out of the signal path, the control circuits 95 emit a digital signal through lines 97, 99 and 101 to a second input of the read-only memory 77. This signal causes the memory 77 to increment the attenuator 15 to increase attenuation by one step and increase the gain of the programmable amplifier 41 by one step. This adjustment does not alter the overall gain of the circuit but it does reduce the level of the signals applied to the mixer 29. The strong distortion causing signals are desirably brought within a linear portion of the mixer 29 by increasing input attenuation of the programmable attenuator 15. Since the programmable amplifier 41 is simultaneously changed, the level of the signal applied to the measuring and display circuits 63 and 13 should stay within their window or range.

Figure 2:
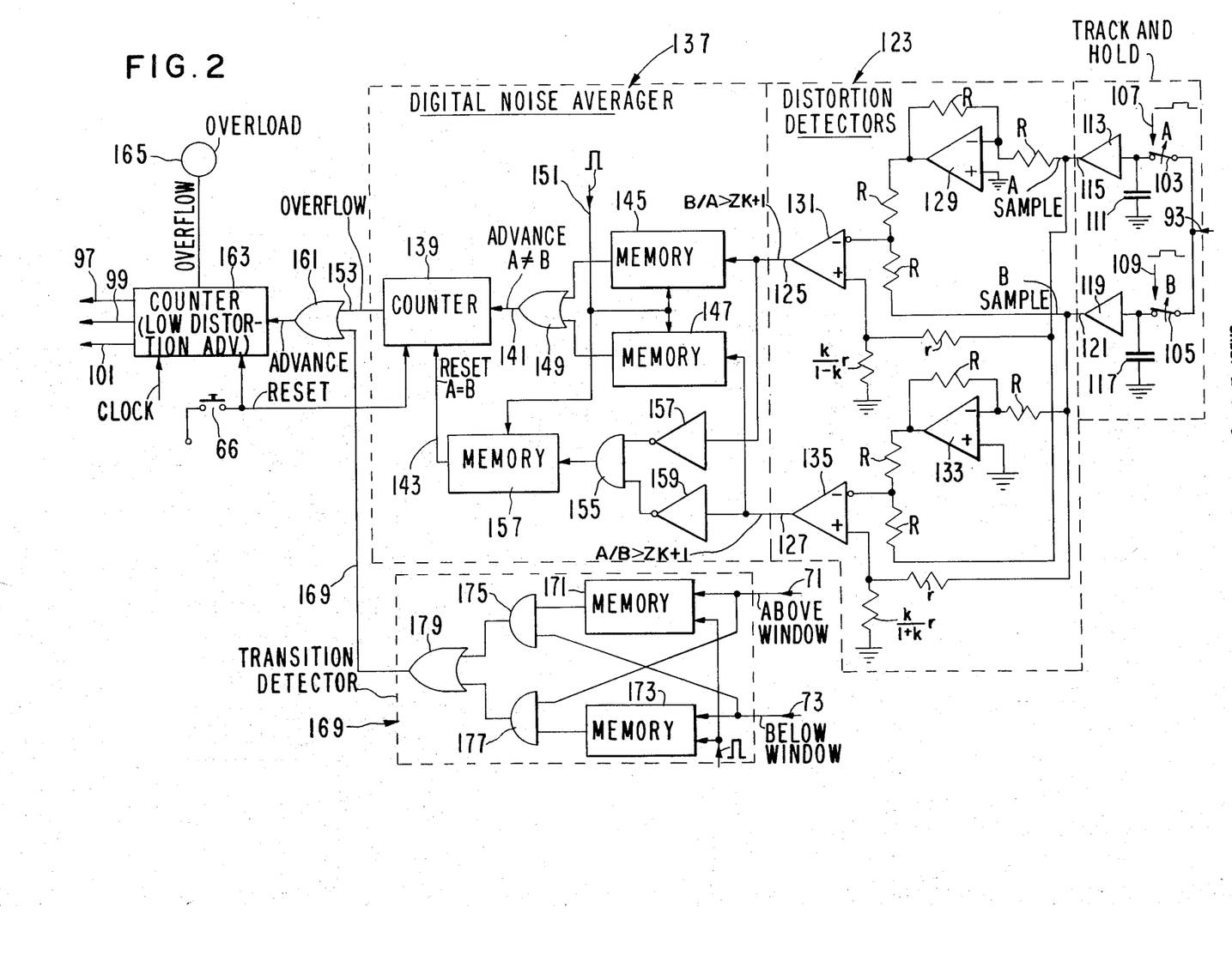
FIG. 2 shows in detail the circuits of one of the blocks of FIG. 1.
Figure 3:
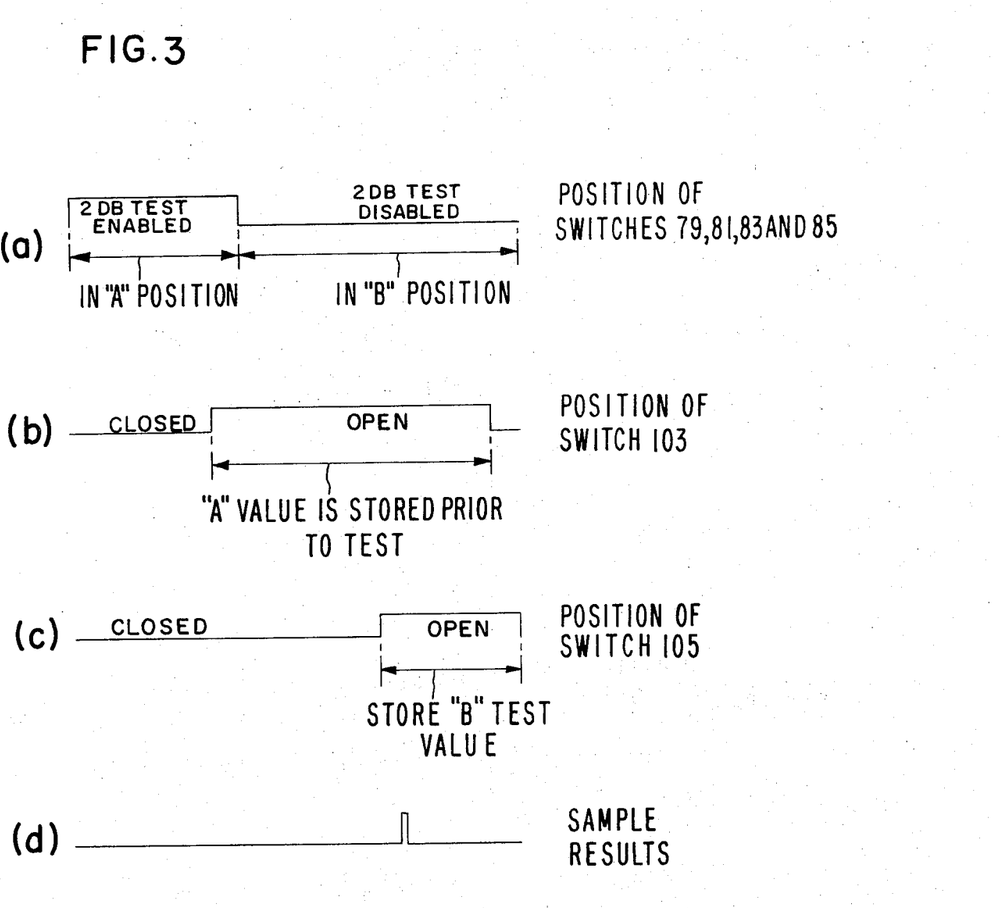
FIG. 3 shows a general timing diagram of the various parts of the circuits of FIGS. 1 and 2.

Referring to FIG. 2, the signal-to-noise ratio control circuit block 95 of FIG. 1 is expanded. The output of the switch 85 of FIG. 1 in the line 93 is connected with parallel semi-conductor switches 103 and 105 that are switched by control signals in lines 107 and 109, respectively. The state of the switches 103 and 105 as a function of time is shown in FIGS. 3 (b) and 3 (c), respectively, for one cycle of operation of switches 79, 81, 83 and 85 of FIG. 1. The operation of these latter switches as a function of time is indicated in FIG. 3 (a). A capacitor 111 at the output of the switch 103 in FIG. 2 stores the voltage level in the line 93 that exists just before the switch 103 is opened. An isolating amplifier 113 maintains this value in its output 115 after the switch 103 is opened. Similarly, a capacitor 117 is connected at the output of the switch 105 and an amplifier 119 transfers the voltage across the capacitor 117 to an output line 121 without loading the capacitor.

With the relative operation of the switches 103 and 105 with respect to switching of the switchable pad 25 and the switchable gain circuit 51, as shown in FIG. 3, the line 115 of FIG. 2 maintains a signal level representative of the signal in the line 93 when the switches 79, 81, 83 and 85 are in their A position. The capacitor 111 holds this value. The switch 105 is open while the switches 79, 81, 83 and 85 are in their B position, thus storing in the capacitor 117 the signal value in the line 93 and presenting in the line 121 a B sample. The A sample in the line 115 and B sample in the line 121 are connected to a distortion detector circuit 123 which produces an error output in a line 125 when the ratio of the B sample to the A sample is greater than the quantity 2K + 1. Similarly, the circuit 123 produces an output in a line 127 when the ratio of the A sample to the B sample is greater than the quantity 2K + 1. A ratio comparison with a threshold value is utilized rather than comparing arithmetic differences between the A and B signals because of the logarithmic basis for measuring and displaying the signal levels. For a particular circuit as described herein, a threshold corresponding to a level of about 0.2 db is utilized.

The distortion detector circuits 123 of FIG. 2 perform arithmetic calculations between the analog A and B sample input signals to produce digital output signals in lines 125 and 127. The particular circuits utilized produces minimum non-linearities and are formed with a minimum number of parts. An amplifier 129 in one distortion detector circuit inverts the A sample signal without changing its gain and a comparator amplifier 131 compares an arithmetical combination of the A sample and B sample with a voltage function at its non-inverting input that is determined by the value of the A sample. Similarly, the other distortion detector branch includes an amplifier 133 for inverting the B sample signal without changing its value and a comparator amplifier 135 for comparing an arithmetical combination of the inverted B sample signal and an A sample signal with a reference at the comparator's non-inverting input. The reference is a function of the B sample value and the predetermined threshold.

A digital noise averaging circuit 137 of FIG. 2 includes as its main element a digital counter 139 that is advanced one count in response to a proper signal in a line 141. The counter 139 is reset to zero by a proper signal in a line 143. The signal in the line 141 is derived from the output lines 125 and 127 of the distortion detectors through digital memories 145 and 147, respectively, whose outputs are combined in an OR gate 149 to form the signal line 141. The memories 145 and 147 are conveniently D-type flip-flop units and change their state to correspond with the input data in response to a clock signal in a line 151. If there is an error output in either of the lines 125 or 127, the signal in the line 141 at the clock time causes the counter 139 to advance one count. When the counter 139 has been advanced for each of several consecutive cycles together, a pulse is emitted in a line 153 at the output of the counter 139. The counter 139 for the specific example described herein may count from 0 to 9 and the output signal in the line 153 occurs as the counter is reset from 9 back to 0 by a further advance signal in the line 141. Thus, when there is a signal in the line 153, it is an indication that distortion above the threshold level has been detected for 10 consecutive cycles in a row of switching the pad 87 and amplifier 91 into and out of the circuit, and that adjusting action should be taken to reduce the effect of the distortion to below the threshold level.

By using such a counter 139, it is assured that adjustments are made to minimize the distortion when in fact distortion exists and not merely when signals are present in the lines 125 or the line 127 due to instantaneous random noise. By making the counter 139 a ten-number counter, the probability of noise causing an adjusting signal in the line 153 is very small. The reset signal line 143 is provided to reset the counter 139 to zero each clock time in the line 151 when no error signal exists in either the line 125 or the line 127. This is accomplished by connecting the signals from the lines 125 and 127 to an AND gate 155 through inverting amplifiers 157 and 159, respectively. The output of the AND gate 159 is stored in a memory 157 which is also preferably a D-type flip-flop. By providing this reset signal, it is assured that the counter 139 will emit an overflow signal in the line 153 only when a distortion level above the predetermined threshold has been detected for 10 consecutive cycles in a row.

The overflow signal in the line 153 is applied through an OR gate 161 to another counter 163 which may be a pair of J–K flip-flops and thus have four possible states. The counter 163 should have the same number of states as possible gain settings in the programmable amplifier 41 of FIG. 1, in this case four. At the beginning of this second phase of testing, as mentioned before, the programmable amplifier 41 is in its 0 db state. Also, the counter 163 has been reset to a base or 0 state condition. In this phase of adjustment, when the counter 139 emits an overflow signal in its line 153, the counter 163 is advanced one count. Through its output lines 97, 99, and 101, the decoding or memory circuit 77 adds 10 db of attenuation to the programmable attenuator 15 of FIG. 1 and simultaneously adds 10 db of gain to the programmable amplifier 41. If distortion is still detected to be at a level in excess of the desired threshold, the counter 139 will be incremented through its 10 counts once again and an overflow signal will again be emitted in the line 153 to increment the counter 163 one more step. This will result in applying through the memory circuit 77 of FIG. 1 another 10 db of attenuation in the programmable attenuator 15 and will change the programmable amplifier 41 from 10 db gain to 20 db gain simultaneously with the attenuator change. This cycle will continue until the distortion detected is less than the preset threshold; that is, when no error signal appears in either of the lines 125 or 127 of the distortion detector 123 of FIG. 2. If the counter 163 has been incremented to its fourth state, and thus the programmable amplifier 41 of FIG. 1 has been set to its maximum gain of 30 db, any further detection of distortion results in a further overflow signal in the line 153 causing an overload light 165 to indicate to an operator that the circuit has been set to the best low distortion condition possible but that the distortion level is still in excess of the desired minimum level. The light 165 is energized in response to an overflow signal from the counter 163.

A push button switch 66 is provided on the front panel of the level meter to allow an operator to reset the counters 139 and 163 which returns the circuits to the highest signal-to-noise ratio setting. This allows the automatic distortion elimination circuits to operate again. An operator may wish to utilize this feature when the overload indicator 165 lights to make sure that the first automatic adjustment was not made in the presence of an instantaneous telephone line transient or for other reasons.

The switch 55 of FIG. 1 is closed for a short time each A and B sample time in the second phase of adjustment, as indicated in FIG. 3 (d). The switch 55 is closed by the sample pulse in the controlling line 57 at an instant when the switches 79, 81, 83 and 85 are in their test disabled or B position. Therefore, the measuring and display circuit blocks 63 and 13 receive a signal that is not modified by either the pad 87 or the amplifier 91.

Referring again to FIG. 1, it should be noted that the particular arrangement of a pad 87 in a position at the input of the frequency translator 27 and an amplifier 91 at the output of the high gain amplifiers 39 and 41 is not the only particular arrangement that can be utilized to accomplish the distortion detection and adjustment according to the techniques of the present invention. For instance, instead of the amplifier 91, a 2 db pad could be placed between the B terminals of the switches 83 and 85 and the A terminals could be joined by a straight wire. The result would be the same as that particularly shown in FIG. 1; that is, the attenuation or gain at both the input circuits and the output circuits of the frequency translator 27 are adjusted by the same incremental amount in a manner to maintain the total gain of the circuit constant. Such a pad between the B terminals of the switches 83 and 85 effectively reduces the post-frequency translator gain of the intermediate frequency amplifiers 39 and 41. Another variation to carry out the complementary gain and attenuation adjustment is to employ an amplifier between the B terminals of the switches 79 and 81 in place of the pad 87. This second variation still provides the required complementary changes in gain or attenuation in the input and output circuits of the frequency translator 27. Such an amplifier between the B terminals of the switches 79 and 81 effectively reduces the pre-frequency translator attenuation of the programmable attenuator 15.

In the first phase of automatic adjustment wherein the programmable attenuator 15 is adjusted to bring the signal level at the output of the detector 53 within a range or window or the measuring and display blocks 63 and 13, there can exist a condition wherein the distortion caused by the mixer 29 is so bad that the input signal cannot be positioned within this window by the automatic mechanism described so far. That is, the level of harmonics within a bandwidth of interest caused by strong signals outside that bandwidth is very high. For this particular circumstance, a transition detector 167 (FIG. 2) is provided that is responsive to the error signals in the lines 71 and 73 of FIG. 1. An output line 169 of the transition detector 167 is connected to a second input of the OR gate 161. The counter 163 will be advanced by an appropriate signal in the line 169, and a resulting increase in the attenuation of the programmable attenuator 15 and in increase in the gain of the amplifier 41 by one step. Such a counter advancing signal occurs in the line 169 when the signal level in the line 65 of FIG. 1 passes completely through the window as the attenuator 15 is changed one step in response to an error signal in one of the lines 71 and 73.

As an example, consider that the signal in the line 65 at one instant of time is greater than $V_{HI}$, the upper voltage of the measuring range or window of the blocks 63 and 13. In response to this, the counter 75 will increment in a manner to add 10 db attenuation to the programmable attenuator 15. If this incremental attenuation causes the signal in the line 65 to drop below the voltage $V_{LOW}$, which is the lower limit of the window, then the transition detector circuit 167 of FIG. 2 will cause the counter 163 to advance in an attempt to reduce or eliminate the distortion which causes the signal level in the line 65 to pass completely through the window. If the distortion is not reduced by such simultaneous adjustment of the attenuator 15 and the amplifier 41, the up-down counter 75 will oscillate between two values as the voltage level in the line 65 goes from a value above the window to a value below and back again. Once the counter 163 has been incremented four counts in response to the transition detector 167 and such oscillation is still occurring, the overload light 165 will indicate to the operator that the circuit is at its limit with respect to distortion and is doing the best it can although it may not be very accurate in its reading. Additionally, circuitry (not shown) is provided for disconnecting one of the error signals 71 or 73 from application to the counter 75 once the counter 163 has been incremented to its maximum value. This disconnection will prevent the continued oscillation of the counter 75 between two values once the distortion has been minimized as much as possible by the automatic circuitry. Continued oscillation of the counter 75 is undesirable because the programmable attenuator 15 will also continue to change between two attenuation levels and thus make a meaningful reading in the digital display 13 impossible.

The transistor detector 167 includes two D-type flip-flop memory units 171 and 173 connected to the error signal lines 71 and 73, respectively. An AND gate 175 emits a digital 1 when the output of the flip-flop 171 and the error signal 73 are both digital 1's, thus indicating a transition from above to below the window. An AND gate 177 forms a digital 1 at its output when the output of the flip-flop 173 is a digital 1 and the error signal in the line 71 is a digital 1, thus indicating a transition from below to above the window. An OR gate 179, whose output is the line 169, is connected at its inputs to the outputs of the AND gates 175 and 177. Thus, a digital 1 will appear in the output line 169 when either error signals 71 and 73 have changed their state in a period between two successive clock pulses. A signal commanding the change in level of the attenuator 15 clocks the memories 171 and 173.

The various aspects of the present invention have been described with respect to a preferred embodiment thereof, but it will be understood that the invention is entitled to protection within the full scope of the appended claims.

I claim:

1. A method of minimizing undesirable effects of regions of non-linearity of circuits within a level meter, said meter forming a signal path having in series adjustable attenuation at its input, a non-linear active electronic device, adjustable gain amplification, and signal measuring circuits of a defined range supplied by an output of the adjustable gain amplification, said method comprising the steps of:
   connecting a signal whose level is to be measured to the adjustable input attenuation,
   simultaneously cycling the attenuation level of the input attenuator and the gain of said amplification between two distinct levels, said cycling being accomplished without changing the overall gain of the level meter from the input of the input attenuation to the measuring circuits,
   detecting any difference in signal level to the measuring circuits as the input attenuation and amplification gain are simultaneously alternated between their two distinct levels,
   electronically comparing said difference in signal level to the measuring circuits with a reference signal having a predetermined threshold magnitude, and
   automatically increasing the input attenuation and the output amplification of the level meter equally in a manner to keep the overall gain constant from the input of the input attenuation to the measuring circuits, said automatic increasing continuing so long as said difference in signal level to the measuring circuits exceeds said predetermined threshold signal magnitude while said automatic increasing terminates in response to said difference signal level falling below said threshold signal magnitude, whereby non-linear distortion is within acceptable limits.

2. The method according to claim 1 wherein the step of simultaneously adjusting the input attenuation level and the amplification gain between two distinct levels includes simultaneously switching a fixed attenuating pad into the level meter signal path prior to the non-linear active electronic device and a fixed gain amplifier into the level meter signal path after the non-linear active electronic device, the fixed attenuation and the fixed gain having equal decibel levels.

3. The method according to claim 1 wherein said two distinct levels differ by substantially 2 decibels.

4. The method according to claim 1 wherein the defined signal range of the measuring circuits is significantly less than the range of the input attenuation, and further wherein a difference between said two distinct levels is a small fraction of the defined signal range of the measuring circuits.

5. The method according to claim 1 which includes an initial step of adjusting said input attenuation level without adjusting the amplification in order to first bring the input signal level within said defined range of said measuring circuits.

6. The method according to claim 1 wherein the step of automatically increasing the input attenuation and the output amplification includes making such increases one step at a time only after the signal level differs from the reference signal amount for a plurality of cycles in succession of the simultaneous cycling of the attenuation level and the amplification between said two distinct levels, whereby simultaneous automatic increases of the input attenuation and the output amplification are less likely to occur from instantaneous noise at the signal input.

7. The method according to claim 1 wherein the method additionally comprises the initial steps of maintaining the output amplification of the level meter at its lowest level, initially setting the input attenuation at its lowest level and then increasing the attenuation level of the input attenuator without adjusting the amplification of the level meter in order to first bring the input signal level within said defined range of said measuring circuits.

8. The method according to claim 7 wherein the step of increasing the attenuation level of the input attenuator includes adding discrete steps of attenuation, the method additionally comprising the steps of monitoring whether an increase of the input attenuation from one step to a next successive step drives the input signal level at the measuring circuits from outside its said defined range on one side and through the defined range and outside thereof on its other side, and increasing the level of output attenuation and the level of input attenuation of the level meter equally in a manner to keep the overall gain constant in order to reduce the distortion which causes the signal level at the measuring circuits to pass completely through its said defined range when the input attenuator is increased alone from one step to another.

9. A level meter, comprising:
an adjustable attenuator for receiving at an input a signal to be measured,
a non-linear electronic element receiving a signal from the adjustable attenuator,
an adjustable gain element connected to amplify an output of the non-linear element,
a signal measuring and display circuit having a defined input signal level range receiving the output of said adjustable gain element,
means for alternating between two fixed levels the gain or attenuation in the path of the signal simultaneously at both the input and output sides of said non-linear element in a manner to keep the overall gain of the circuit constant, and
means responsive to the signal applied to said measuring and display circuits for automatically adjusting simultaneously the input adjustable attenuator and the amplification of said adjustable gain element to minimize any differences that may exist in the signal level to the measuring and display circuit when the gain or attenuation in the path of the signal at both sides of the frequency selecting means is simultaneously alternated between said two fixed levels.

10. A level meter according to claim 9 wherein the automatic adjusting means includes a means for comparing to a threshold value any difference in the signal to the measuring and display circuit as said fixed gain or attenuation is switched between its said two fixed levels and causing adjustment of the input attenuation and adjustable gain element only if said difference exceeds said threshold.

11. A level meter according to claim 10 wherein said automatic adjusting means additionally includes means for examining whether said signal level difference at the input to the measuring and display circuit exceeds a threshold level for a plurality of cycles of alternating between said two fixed levels of gain or attenuation before an adjustment of the input attenuator and the amplifier is permitted to take place, whereby adjustment thereof in response to random instantaneous noise is prevented.

12. A signal level meter according to claim 9 wherein a difference between said two fixed levels of gain or attenuation in the path of the signal at both the input and output sides of said non-linear element is significantly less in magnitude than the range of said measuring and display circuit.

13. A signal level meter according to claim 12 wherein said difference between said two fixed levels is substantially two decibels and the range of said measuring and display circuit is substantially 10 decibels.

14. A signal level meter according to claim 13 wherein the adjustable input attenuator and the amplifier are each adjustable by steps of substantially 10 decibels.

15. A signal level meter, comprising:
an adjustable attenuator for receiving at an input a signal to be measured,
a non-linear electronic element receiving a signal from the adjustable attenuator,
an adjustable gain element connected to amplify an output of the non-linear element,
a signal measuring and display circuit having an input signal level range that is significantly less than the range of adjustment of said input attenuator, said measuring and display circuits receiving the output of said amplifier,
means for alternating between two fixed levels the gain or attenuation in the path of the signal simultaneously at both the input and output sides of said non-linear element in a manner to keep the overall gain of the circuit constant, and
means responsive to the signal applied to said measuring and display circuits for automatically adjusting simultaneously the input adjustable attenuator and the amplification of said adjustable gain element to minimize any differences that may exist in the signal level to the measuring and display circuit when the gain or attenuation in the path of the signal at both sides of the frequency selecting means is simultaneously alternated between said two fixed levels, said automatic adjusting means comprising means for examining whether said signal level difference at the input to the measuring and display circuit exceeds a threshold level for a plurality of successive cycles of alternating between said two fixed levels of gain or attenuation before an adjustment of the input attenuator and the amplifier is permitted to take place, said examining means including a digital counter that is advanced in count a predetermined amount in response to the difference in signal level at the input to the measuring and testing circuit exceeding said threshold level during one cycle of changing between said two fixed levels of gain or attenuation, said counter being reset when said signal level difference is less than said threshold level during one cycle of changing between said two fixed levels, and further wherein said counter emits an overflow signal upon exceeding its maximum count which simultaneously effects a change in the setting of the adjustable input attenuator and the intermediate frequency amplifier.

16. A frequency selective level meter, comprising:

an input attenuator that is adjustable between a plurality of attenuation levels, a frequency translator including a mixer and an adjustable oscillator for translating a signal at an output of the attenuator to a fixed frquency bandwidth, a high gain amplifier having a plurality of adjustable gain values for receiving a fixed frequency signal output of the frequency translator and applying it to a measuring and display circuit of a fixed input signal range, a digital decoding circuit responsive to a first digital input for changing the attenuation level of said input attenuator and further responsive to a second digital input for simultaneously increasing the attenuation of said input attenuator and increasing the gain of said high gain amplifier by equal amounts, means for applying a first digital signal to said decoding circuit in response to the detection of a signal level input to the measuring and display circuit falling outside the range of said measuring and display circuit, a first means between said input attenuator and said frequency translator for switching between two attenuation or gain levels separated a preset amount, a second means at the output of said frequency translator for switching between said two gain or attenuation levels separated by said preset amount, means for simultaneously cycling said first and second switching means between said two levels in a manner that the overall gain of th signal level circuits remains constant, said switching means being enabled only after the signal to said measuring and display circuits has been adjusted to be within its said input signal range by operation of said first digital signal applying means, means responsive to the signal applied to the measuring and display circuits for determining when said signal varies in level by more than a predetermined threshold amount as said first and second switching means are cycled between their two gain or attenuation levels, and means responsive to said detecting means for generating a signal that is applied to said decoding means as its second digital input when the difference signal to the measuring and detecting circuits is greater than said threshold for a plurality of consecutive cycles of said first and second switching means.

17. A frequency selective level meter according to claim 16 which additionally comprises a transition detector for generating a signal that is applied to said decoding circuit as its second digital input when in response to its first digital input said decoding circuit causes the signal level to the measuring and display circuits to pass completely through its said input signal range.

18. A level meter, comprising:

an adjustable attenuator for receiving at an input a signal to be measured, a non-linear electronic element receiving a signal from the adjustable attenuator, an adjustable gain element connected to amplify an output of the non-linear element, a signal measuring and display circuit having an input signal level range that is significantly less than the range of adjustment of said input attenuator, said measuring and display circuits receiving the output of said amplifier, means sensing the level of the signal applied to said measuring and display circuit for increasing attenuation of the adjustable attenuator to bring the signal level within said input range while adjustable gain element remains fixed, means operable after the signal level to the measuring and display circuits falls within its said input range for alternating between two fixed levels the gain or attenuation in the path of the signal simultaneously at both the input and output sides of said non-linear element in a manner to keep the overall gain of the circuit constant, and means responsive to the signal applied to said measuring and display circuits for automatically adjusting simultaneously the input adjustable attenuator and the amplification of said adjustable gain element to minimize any differences that may exist in the signal level to the measuring and display circuit when the gain or attenuation in the path of the signal at both sides of the frequency selecting means is simultaneously alternated between said two fixed levels.

19. A level meter according to claim 18 which additionally comprises means for detecting when the input signal level to the measuring and display circuits passes completely through its input signal level range upon addition of one step of attenuation of the adjustable attenuator, and means enabled by said detecting means for simultaneously increasing the attenuation level of the adjustable attenuator and the amplification of the adjustable gain element by equal increments until the addition of one step of attenuation of the adjustable attenuator by the sensing means no longer causes the signal level to the measuring and display circuits to pass through its said input range.

* * * * *